US006905159B1

(12) United States Patent
Saito et al.

(10) Patent No.: US 6,905,159 B1
(45) Date of Patent: Jun. 14, 2005

(54) PICK-UP STYLE UTILITY VEHICLE WITH TWO-WAY LATCH SYSTEM

(75) Inventors: Hideo Saito, Lincoln, NE (US);
Kazumasa Hisada, Lincoln, NE (US)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/930,190

(22) Filed: Aug. 30, 2004

Related U.S. Application Data

(63) Continuation-in-part of application No. 10/785,201, filed on Feb. 23, 2004.

(51) Int. Cl.[7] ............................................. B62D 25/00
(52) U.S. Cl. ............................. 296/65.01; 296/65.09; 296/26.08; 296/26.09; 296/183.1; 296/186.4
(58) Field of Search .................... 296/63, 65.01, 296/66, 65.09, 65.05, 26.08, 26.09, 26.11, 296/183.1, 186.4, 186.5, 190.11

(56) References Cited

U.S. PATENT DOCUMENTS

| | | | |
|---|---|---|---|
| 3,169,792 A | * | 2/1965 | Viquez ...................... 296/99.1 |
| 4,480,868 A | * | 11/1984 | Koto ...................... 296/190.11 |
| 6,260,916 B1 | * | 7/2001 | Hunt ...................... 296/190.11 |
| 6,398,291 B1 | * | 6/2002 | Reusswig et al. ........ 296/186.4 |
| 6,450,566 B1 | * | 9/2002 | Hong ..................... 296/190.11 |
| 6,478,355 B1 | * | 11/2002 | Van Eden et al. ......... 296/37.6 |
| 6,481,772 B1 | * | 11/2002 | Tenn ....................... 296/26.11 |
| 6,517,135 B2 | * | 2/2003 | de Gaillard .............. 296/26.09 |
| 6,550,849 B1 | * | 4/2003 | Dosdall .................... 296/183.1 |
| 6,786,535 B1 | * | 9/2004 | Grzegorzewski et al. ..................... 296/190.11 |

* cited by examiner

*Primary Examiner*—Joseph D. Pape
(74) *Attorney, Agent, or Firm*—Alleman Hall McCoy Russell & Tuttle LLP

(57) ABSTRACT

A pick-up style utility vehicle is provided. Typically, the vehicle includes a movable seat and an adjustable cargo bed, each configured to be alternatively positioned in an overlapping area of movement. The vehicle further includes a latch system including a latch body and a first retainer provided on the seat and a second latch retainer provided on a portion of the cargo bed. The latch body is typically configured to alternatively be secured to the seat or to the cargo bed by interlocking with either the first or the second latch retainer.

9 Claims, 14 Drawing Sheets

PICK-UP STYLE UTILITY VEHICLE WITH TWO-WAY LATCH SYSTEM

CROSS-REFERENCE TO RELATED APPLICATION

This application is a continuation-in-part of U.S. patent application Ser. No. 10/785,201, filed Feb. 23, 2004, entitled PICK-UP STYLE UTILITY VEHICLE WITH ADJUSTABLE CARGO BED, the entire disclosure of which is herein incorporated by reference for all purposes.

TECHNICAL FIELD

The present invention generally relates to a pick-up style utility vehicle with an adjustable cargo bed, and more particularly relates to a pick-up style utility vehicle with an adjustable cargo bed and a movable seat that the user may selectively position to optimize cargo space and passenger space, and more particularly relates to a two-way latch system configured to be alternatively secured to the seat or to the cargo bed.

BACKGROUND OF THE INVENTION

Pick-up style utility vehicles are typically characterized by a cargo bed located behind one or more rows of seats, each row having one or more seats. Each seat typically has a leg space positioned immediately in front of the seats, such that a person may ride in a sitting position. A steering wheel is typically positioned above the leg space of one of the seats. Pick-up style utility vehicles may be contrasted with other utility vehicles such as all-terrain vehicles (ATVs), which have a seat that is straddled by a rider and a handle bar for steering. Pick-up style utility vehicles are used for a wide variety of off-road utility applications, such as moving materials including lumber, farm and ranch tasks, golf course maintenance, hunting, etc.

Prior pick-up style utility vehicles with two rows of seats generally suffer from the drawback that less cargo may be accommodated, since the cargo bed must typically be shortened to allow room for an additional row of seats. Prior pick-up style utility vehicles with only one row of seats are typically equipped with larger cargo beds, but cannot accommodate a larger number of passengers. Thus, users that occasionally carry a large number of passengers, and occasionally carry large loads find that they cannot accomplish both tasks well with the same vehicle.

BRIEF SUMMARY OF THE INVENTION

A pick-up style utility vehicle with a two-way latch system is provided. According to one aspect of the invention, the utility vehicle includes a vehicle body, the vehicle comprising a seat coupled to the vehicle body and configured to be movable between a stowed configuration and a deployed configuration, a cargo bed adjustably provided behind the seat and configured to be adjustable to a first configuration in which the cargo bed is moved into an area formerly occupied by the seat after the seat is retracted in the stowed configuration, and to a second configuration in which the cargo bed is moved away from the area to be occupied by the seat in the deployed configuration; and a latch including a latch body and a first latch retainer and a second latch retainer, wherein the latch body is provided on the vehicle body and configured to alternatively be secured to the seat or to the cargo bed by interlocking with either the first latch retainer or the second latch retainer, wherein the first latch retainer is provided on the seat, and configured to be located in an interlockable position relative to the latch body when the seat is in the deployed configuration and the cargo bed is in the second configuration, wherein the second latch retainer is provided on the cargo bed, and configured to be located in the interlockable position relative to the latch body when the seat is in the stowed configuration and the cargo bed is in the first configuration.

The movable seat may be at least a rearmost one of a plurality of seats disposed in a tandem manner.

A portion of the cargo bed may be configured to slide from the first to the second configuration and, the portion of the cargo bed may form a side portion of the cargo bed. Further, a portion of the cargo bed may be configured to rotate from the first to the second configuration.

The latch may be an over-center latch.

The latch body may include a base attached on the body of the vehicle, a lever pivotably accommodated in the base and configured to be manipulable by a user, and a latch loop extended from the lever and configured to be hooked to the latch retainer.

The above and further objects and features of the invention will more fully be apparent from the following detailed description with accompanying drawings.

DETAILED DESCRIPTION OF THE INVENTION

The present invention will now be described in detail referring to the accompanying drawings illustrating the embodiments thereof.

Figure 1:
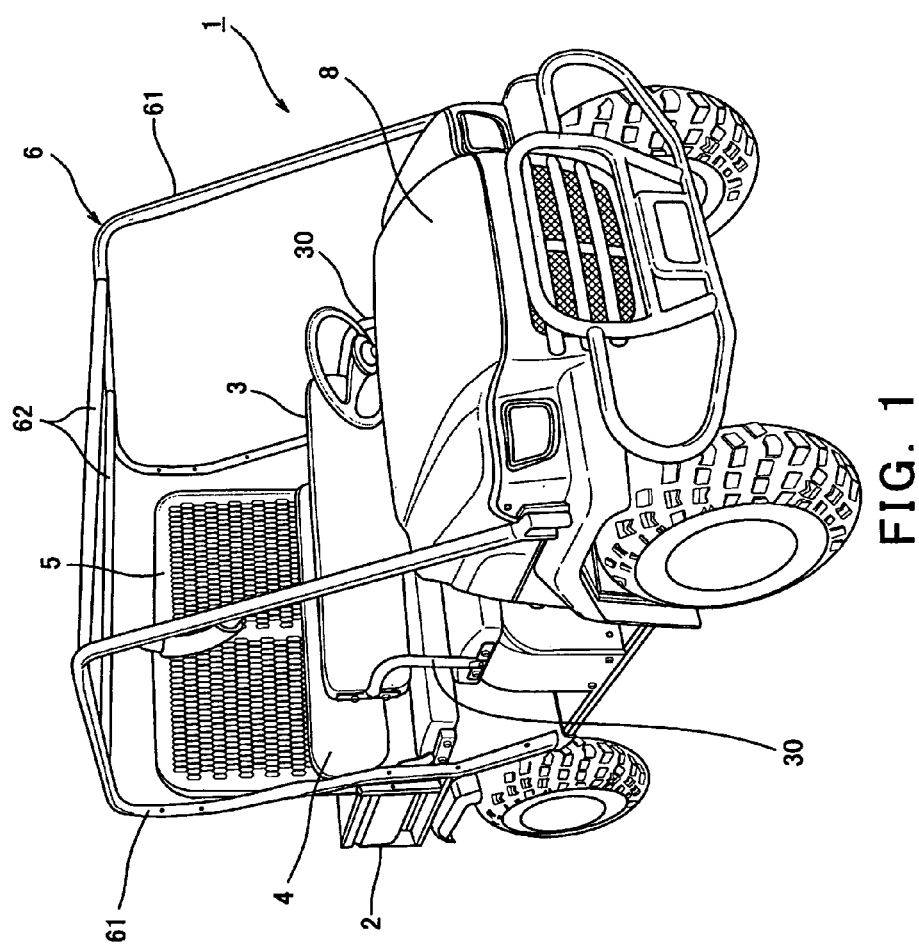
FIG. 1 is a perspective view of a pick-up style utility vehicle with an adjustable cargo bed according to one embodiment of the present invention.

FIG. 1 is a perspective view of a pick-up style utility vehicle 1 according to one embodiment of the present invention. The vehicle typically has a body coupled to four rotatable wheels, and one or more rows of seats, each row having one or more places for a person to sit. Vehicle 1 typically includes a front seat 3, which is typically a bench seat configured to accommodate up to two persons, one side of which is used as a driver's seat and the other side of which may be used as a passenger's seat. Vehicle 1 typically further includes a rear seat 4, which is also typically a bench seat configured to accommodate two passengers. Thus vehicle 1 typically may accommodate up to four persons in total. Of course, the above embodiment is merely illustrative, and it will be appreciated that various other seat configurations may be provided. For example, each of the front and rear rows of seats may include pairs of individual seats, rather than bench seats, or each of the rows of seats may only be designed to accommodate one passenger. Behind the rear seat 4, there is provided a cargo bed 2. Cargo bed 2 is typically rectangular in shape, and includes a surrounding panel assembly formed around its perimeter, the surrounding panel assembly including a front panel and side panels. Alternatively, the cargo bed may be of another suitable polygonal or curved shape for holding cargo. A divider 5 is attached to the foremost end of the cargo bed 2 to separate the rear seat 4 from the cargo bed 2. Typically, the divider is a meshed screen shield 5. Alternatively, the divider may be a non-meshed panel or other suitable dividing structure.

A cabin frame 6 is provided over the seats, and defines a cabin space for the driver and passengers. The cabin frame 6 includes a pair of side bars 61 provided on the right and left sides of the vehicle body to define side face of the vehicle 1. Typically the side bars arc from the front to the rear of the vehicle to define a passageway through which passengers may enter and exit seats 3, 4. A front portion of each side bar typically attaches to the vehicle body at a respective mounting location adjacent a right or left side of a hood 8 of the vehicle, and extends rearwardly and upwardly to a roof. The roof is typically substantially flat, and defined by a middle portion of each of the side bars 61 and a plurality of transverse bars 62 stretching between the side bars. The roof is typically formed to provide sufficient head room for any passengers seated in seats 3, 4. A rear portion of each of the side bars extends downward from the roof and attaches to the vehicle body adjacent the rear seats 4. Arm bars 30 may also be provided adjacent a right and left side of seat 3, and typically mount the seat back to the seat base of seat 3. Alternatively, the cabin may be formed in another shape suitable to hold passengers.

Figure 2A:
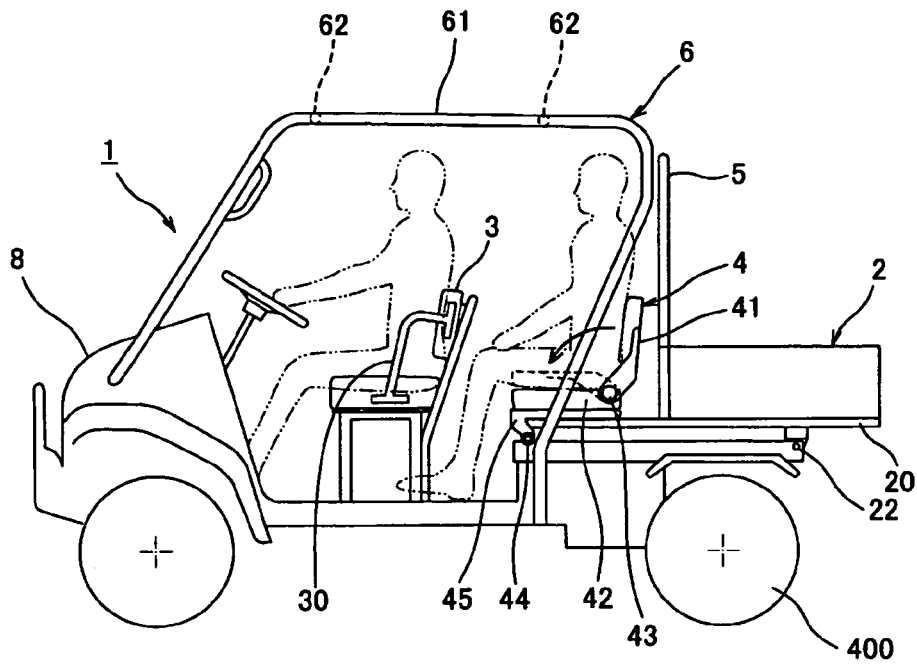
FIG. 2A is a schematic left side view of the FIG. 1 with the vehicle's rear seat occupied by passenger(s)
Figure 2B:
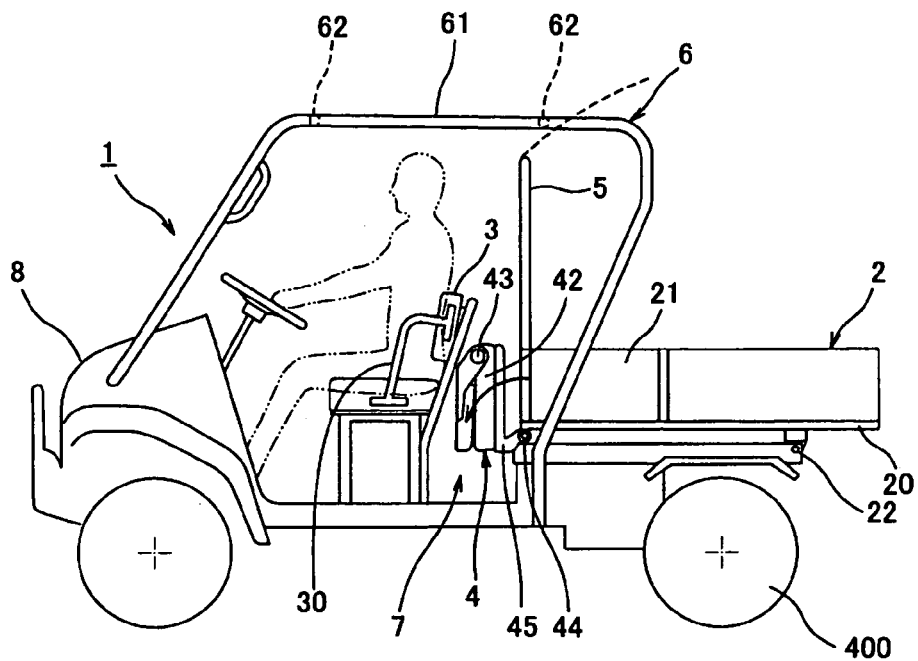
FIG. 2B is a view of the utility vehicle of FIG. 2A, showing the rear seat retracted and the cargo bed extended.

As shown in broken lines in FIGS. 2A and 2B, rear seat 4 is coupled to the body of the vehicle in a manner that enables the rear seat to be movable between a stowed configuration, shown in FIG. 2B, and a deployed configuration shown in FIG. 2A. The rear seat 4 typically includes the seat base or bottom portion 42 upon which one or more passengers may sit, and the seat back or backrest portion 41 configured support each passenger's back. The bottom portion 42 is typically supported in the deployed configuration by the bottom plate 20 of the cargo bed 2. A lower end of the backrest portion 41 is typically pivotably mounted by a pivot 43 to a rear end of bottom portion 42, such that the back portion may be folded forward by a user to lie in a substantially flat intermediate position, shown in dashed lines in FIG. 2A. Further, a front end of the bottom portion 42 is hinged to the vehicle body so as to be rotatable around a pivot 44. Typically, the bottom portion 42 is connected to the pivot 44 through an arm 45 extending downwardly from the front end of the bottom portion 42, so that a bottom surface of the bottom portion 42 is moved to a location forward of the pivot 44 when retracted. Thus, the seat can be moved from the intermediate position to a stowed configuration, shown in FIG. 2B, in which the entire rear seat 4 is retracted into a leg space 7 of the vehicle. The leg space is typically defined as the space in front of and/or below the rear seat 4 in the deployed configuration, where a passenger might rest his or her legs while riding in the vehicle.

In this embodiment, cargo bed 2 is configured to be extendable forward into a space at least partially occupied by the rear seat 4 when the rear seat was in the deployed configuration, as described in more detail hereinafter. The screen shield 5 may be manually removed from the cargo bed 2 and reattached to a foremost end of an extendable portion 21 of the cargo bed 2, to enable the screen shield 5 to be repositioned from a position adjacent the forward end of the cargo bed in the retracted configuration to a position adjacent the forward end of the cargo bed in the extended configuration.

Thus, a user who desires to carry a large load rather than passengers in the rear seat 4, may move the rear seat from the deployed to the stowed configuration, thereby freeing space formerly occupied by the rear seat in the deployed configuration. This may be accomplished by folding down the back portion 41 to the intermediate position, and pivoting the bottom portion 42 with the folded backrest portion 41 into the stowed configuration in leg space 7. Once the seat is in the stowed configuration, the user may remove the screen shield 5 from the cargo bed 2, and extend extendable portion 21 of the cargo bed from a retracted configuration to an extended configuration, into the space freed by moving the seat. The user typically may accomplish this by extending the sides of the cargo bed, by pivoting or sliding, as discussed below. Once the cargo bed is in the extended configuration, the user may reattach the screen shield 5 adjacent a forward end of the cargo bed 2 in the extended configuration, thereby providing extended cargo space for the large load. The cargo bed 2 may typically by configured to be tiltable around a pivot 22 to dump cargo therein not interfering with the rearmost transverse bar 62, as shown with a dot line in FIG. 2B.

Figure 3A:
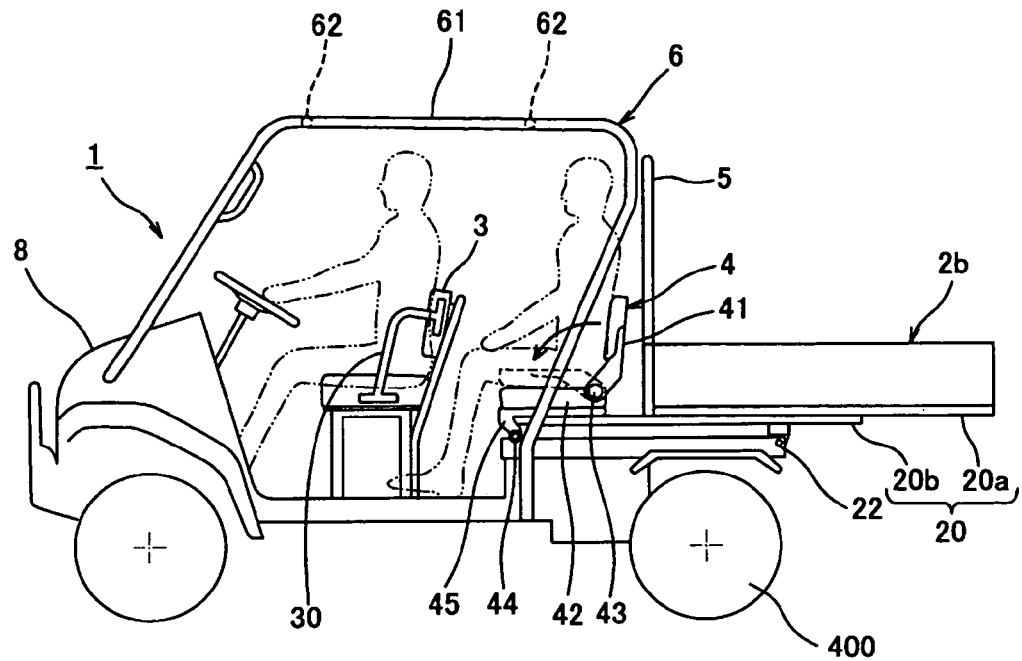
FIG. 3A is a schematic left side view of the utility vehicle of another embodiment according to the present invention with the vehicle's rear seat occupied by passenger(s)
Figure 3B:
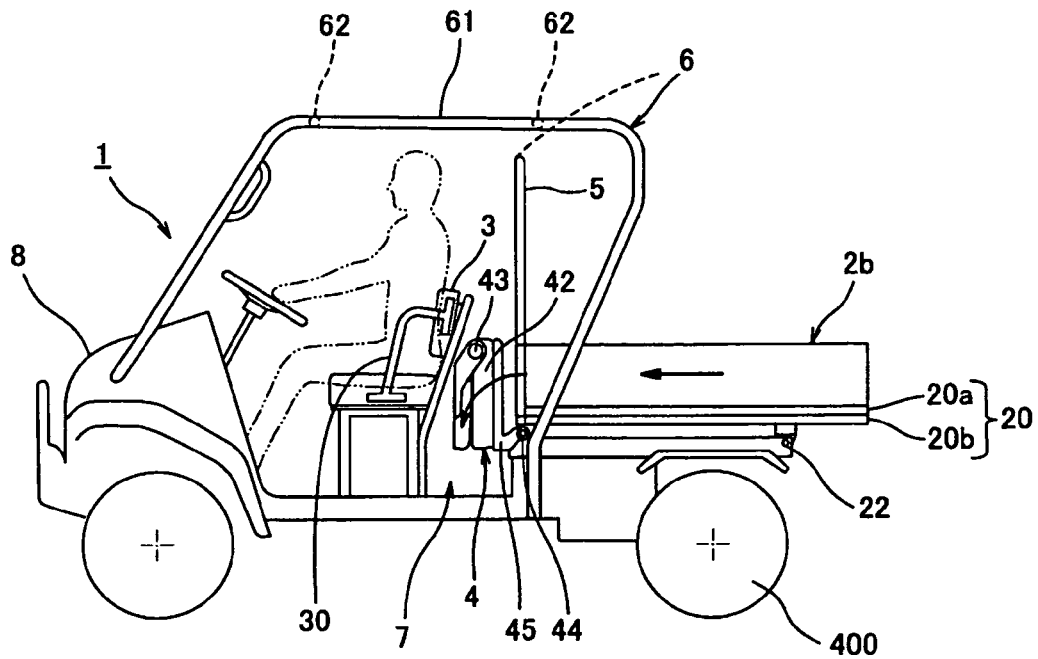
FIG. 3B is a view of the utility vehicle of FIG. 3A, showing the rear seat retracted and the cargo bed moved forward.

According to another embodiment of the present invention, shown in FIGS. 3A and 3B, utility vehicle 1 may include a relatively large cargo bed 2b which is slidably attached to the vehicle body, such that the cargo bed may be moved between a second configuration, also referred to as an overhang configuration, shown in FIG. 3A, in which a rear end of the cargo bed overhangs the rear wheels 400 of the vehicle to a greater extent, and a first configuration, also referred to as a compact configuration, shown in FIG. 3B, in which the rear end of the cargo bed overhangs the rear wheels 400 of the vehicle to a lesser extend than the second configuration, and in which the forward end of the cargo bed is position in a space formerly occupied by the rear seat in the deployed configuration. The bottom plate 20 of the cargo bed 2b typically includes an upper bottom plate 20a and a lower bottom plate 20b, which are slidable relative to each other along a longitudinal direction of the vehicle, to thereby enable the cargo bed to move between the first and second configurations.

A portion of the lower bottom plate 20b is positioned beneath the bottom portion 42 of the rear seat 4 to stably hold the bottom portion 42 thereon when the entire rear seat 4 is not retracted. Typically, this embodiment is manufactured using substantially the same chassis as the embodiment shown in FIGS. 2A and 2B, and only the structure of the cargo bed differs between the embodiments.

With this configuration, even when the rear seat 4 is occupied by one or more passengers, the cargo bed 2b can carry a large load. However, in this embodiment, since an upper part of the cargo bed 2b, excluding lower bottom plate 20b, protrudes to the rear of vehicle 1 well over a pivot 22 around which the entire cargo bed 2b can be tilted for unloading when unlocked, a load in a rear portion of the cargo bed 2b creates a moment around the pivot 22. Therefore, as shown in FIG. 3B, the upper part of the cargo bed 2b is formed to be manually slid forward with respect to the lower bottom plate 20b until a front portion of the upper part of the cargo bed 2b reaches a location formerly occupied by the stowed rear seat 4. In this embodiment, while cargo bed 2b is not typically configured to be adjustable in size, a relatively large cargo bed may be provided, which may be moved into an overhang configuration to accommodate passengers, or into a compact configuration when the rear seat is stowed. The cargo bed 2b may typically be configured to be tiltable around a pivot 22 to dump cargo therein not interfering with the rearmost transverse bar 62, as shown with a dot line in FIG. 3B.

Figure 4A:
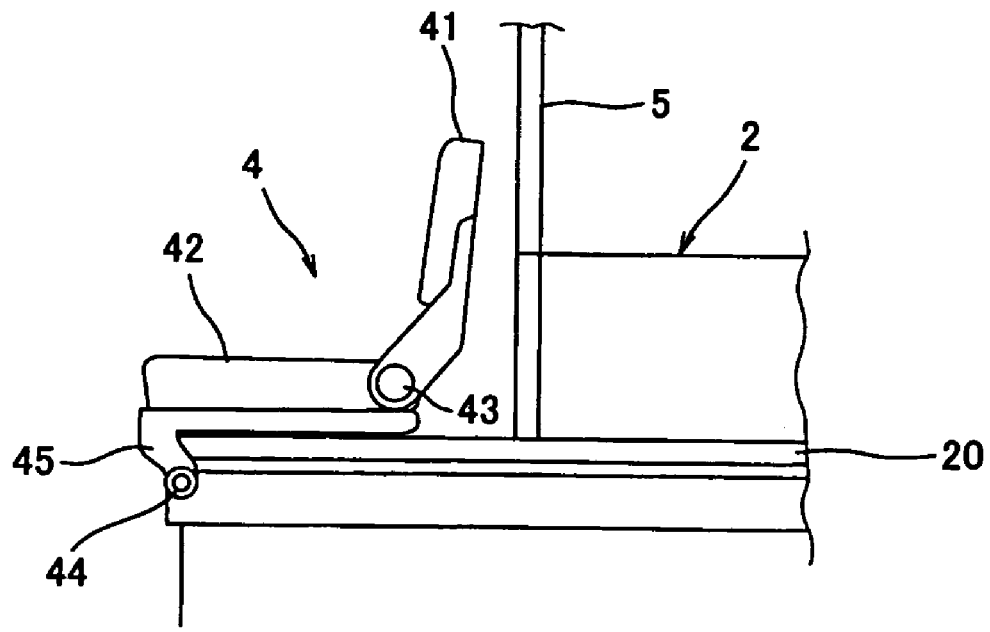
FIG. 4A is a partial schematic view of the utility vehicle in the configuration shown in FIG. 2A, showing the rear seat in the deployed configuration.
Figure 4B:
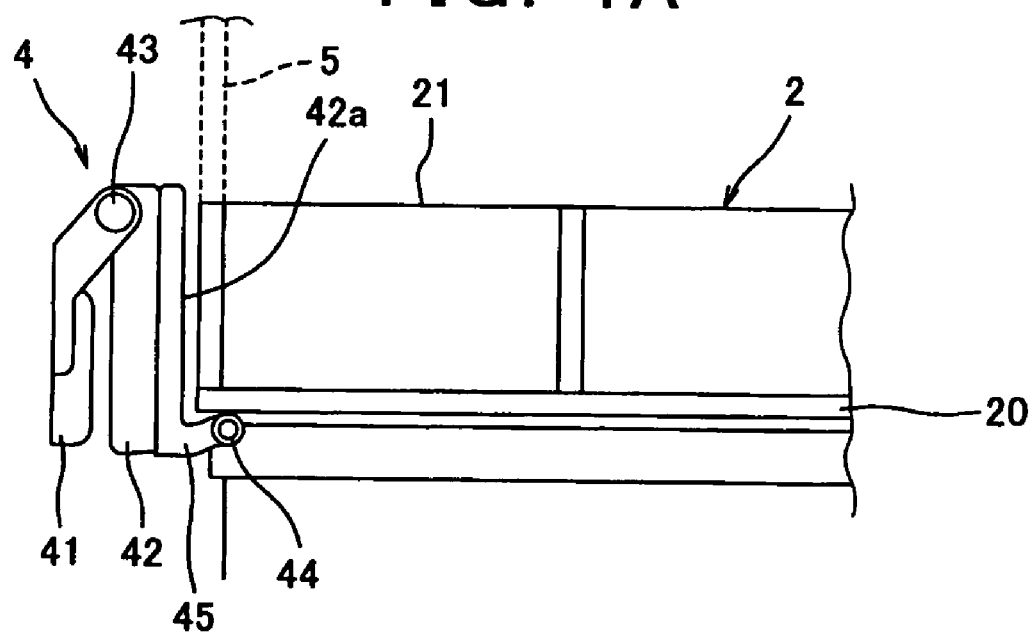
FIG. 4B is a partial schematic view of the utility vehicle in the configuration shown in FIG. 2B, showing the rear seat in the stowed configuration, in which a bottom of the rear seat is positioned adjacent a front panel of the cargo bed.

Returning to the embodiment discussed with respect to FIGS. 2A and 2B, it will be appreciated that the rear seat 4 may be utilized as a front panel for the cargo bed 2. As shown in detail in FIG. 4A, the rear seat 4 may be pivotably mounted to the vehicle's body. As shown in FIG. 4B, the rear seat 4 may be manually retracted to a stowed configuration such that a bottom surface 42a of the bottom portion 42 of the rear seat 4 covers a front opening of the cargo bed 2, and the rear seat 4 is locked to the position by an appropriate locking mechanism (not shown). In this example, the rear seat 4 serves as the front panel of the cargo bed 2 and, thus, typically no screen shield 5 is installed. However, the screen shield 5 may be attached to the extendable portion 21 of the cargo bed 2, if desired.

Figure 5A:
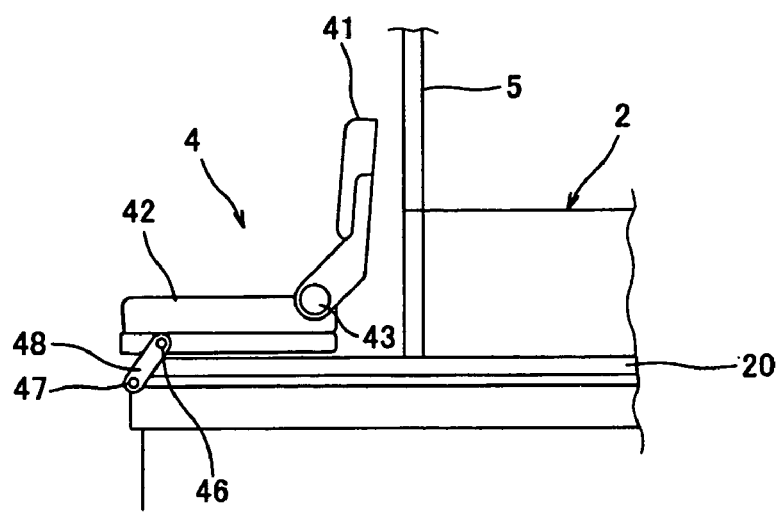
FIG. 5A is a partial schematic view of the utility vehicle shown in the configuration shown in FIG. 2A, showing the rear seat in a deployed configuration.
Figure 5B:
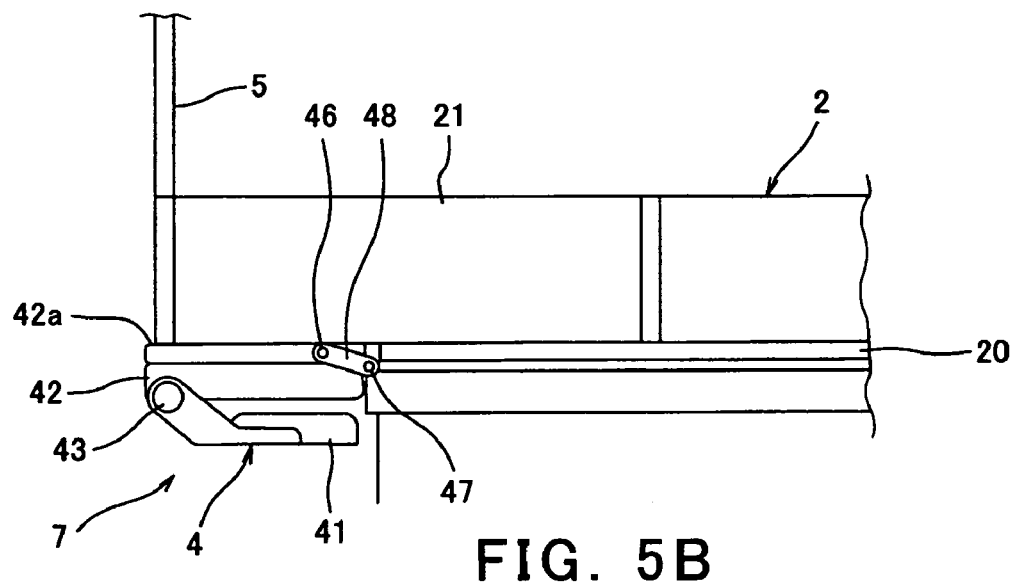
FIG. 5B is a partial schematic view of the utility vehicle in the configuration shown in FIG. 2B, showing the rear seat in a stowed configuration, in which a bottom of the rear seat is positioned adjacent a bottom plate of the cargo bed.

According to another embodiment of the present invention, shown in FIGS. 5A and 5B, the vehicle 1 may be configured such that the rear seat 4 may be folded flat and a portion of the cargo bed 2 may be extended forward to rest upon bottom surface 42a of the seat. The rear seat 4 is configured to be movable to a stowed position in which bottom surface 42a is substantially parallel and positioned upside down in front of bottom plate 20, such that a portion of the cargo bed 2 (such as extendable portions 21) may rest upon the bottom surface of the seat. As shown in FIG. 5A, the rear seat 4 is hinged to the vehicle body utilizing a hinge 48 having two pivots 46, 47. As shown in FIG. 5B, the entire rear seat 4 can be manually retracted to an upside-down configuration into leg space 7, and the rear seat 4 may be locked to the position by an appropriate locking mechanism (not shown). Therefore, the entire bottom portion 42 is moved in front of the pivot 47 when in the retracted configuration, so that the bottom surface of the bottom portion 42 and the foremost part of the bottom plate 20 of the cargo bed 2 form a substantially continuous plane. The configurations shown in FIGS. 4A and 4B, and FIGS. 5A and 5B can also be applied to the cargo bed 2b shown in FIGS. 3A and 3B.

Figure 6:
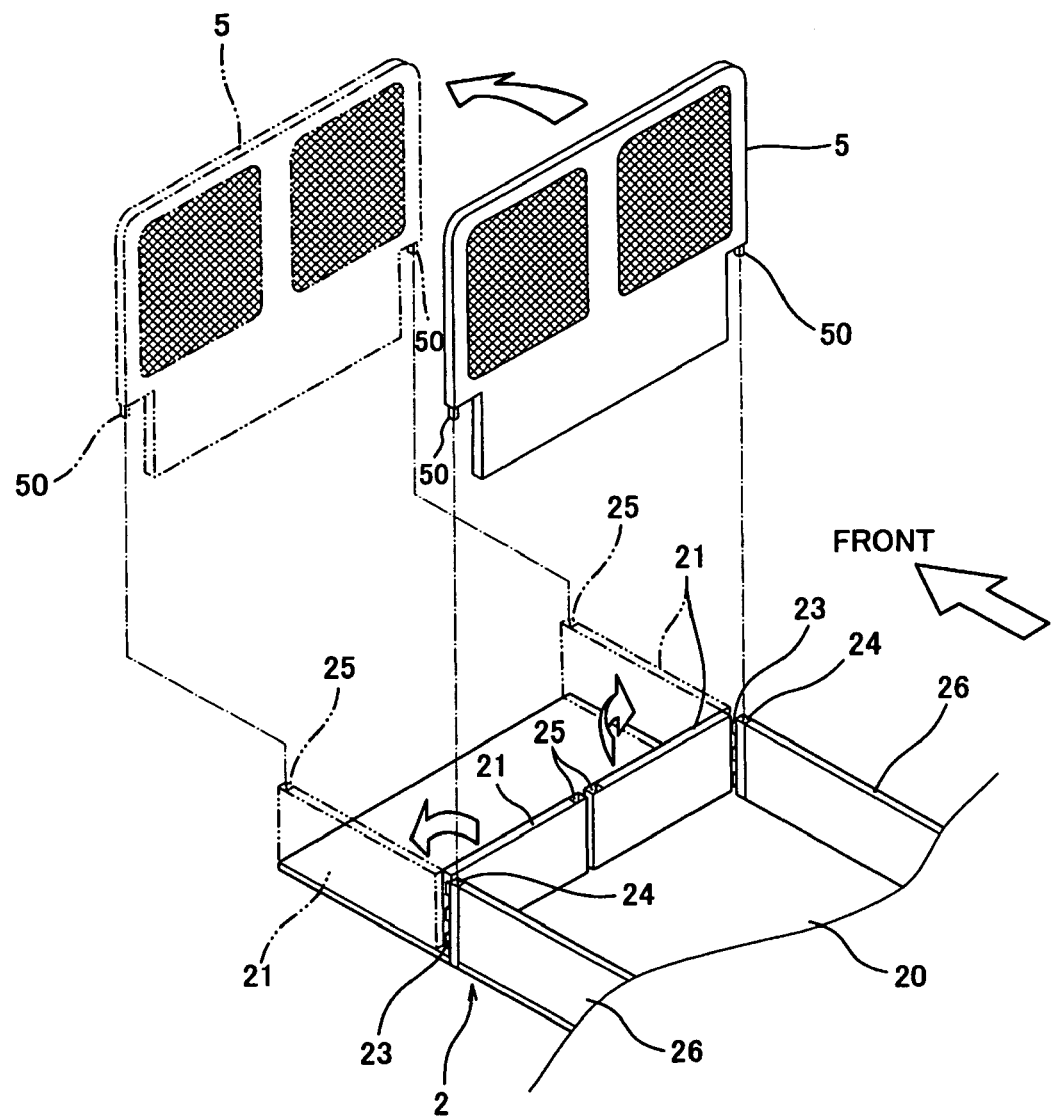
FIG. 6 is a perspective view of the cargo bed of FIGS. 2A and 2B, showing extendable portions of the cargo bed according to one embodiment of the present invention, the extendable portions being configured to rotatably extend from a retracted configuration in which the portions border a front panel of the cargo bed, to an extended configuration in which the extendable portions form side panels of the cargo bed.
Figure 7:
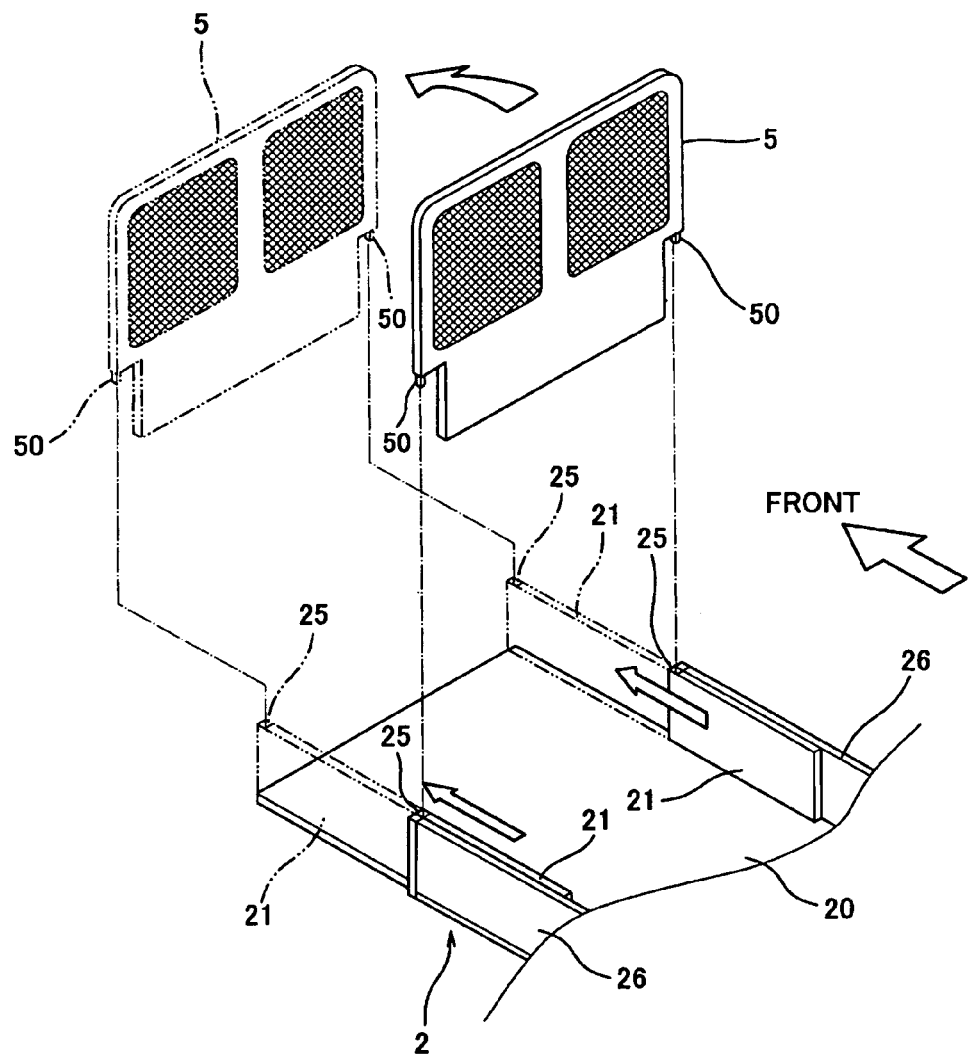
FIG. 7 is a perspective view of a cargo bed of FIGS. 2A and 2B, extendable portions of the cargo bed according to another embodiment of the present invention, in which the extendable portions are configured to slide from a retracted position to an extended position along the sides of the cargo bed.

The extension of the cargo bed 2 may be achieved as shown in FIGS. 6 and 7. FIG. 6 shows extendable portions 21 serving as a front panel of cargo bed 2 when extendable portions 21 in a retracted configuration. Each of the extendable portions 21 is hinged at a proximate end by hinges 23 to a front end of a respective side panel 26. Each of the extendable portions typically has a length of approximately a half of the width of the cargo bed 2. The extendable portions 21 may be moved from the retracted configuration in which they serve as the front panel, as illustrated with solid lines in FIG. 6, by pivoting the extendable portions around the hinges 23 approximately 90 degrees to an extended configuration illustrated with two-dot-chain lines in FIG. 6.

As also shown in FIG. 6, an opening 24 (typically square) is formed so as to be opened upwardly at the front end of each of the side panels 26. The screen shield 5 is typically substantially a rectangular shape and its upper part has a width corresponding to the distance between outer surfaces of the side panels 26. The lower part of the screen shield 5 is narrowed to correspond the distance between inner surfaces of the side panels 26. Typically, the upper part of the screen shield 5 is meshed and the meshed portion is divided in two at the middle thereof, to leave a solid rib therebetween to add strength to the screen shield 5. Bosses 50 are provided to the upper end of the narrowed section of the screen shield 5 so as to protrude downwardly. The screen shield 5 is attached to the front ends of the side panels 26 so that the bosses 50 are inserted into the openings 24 formed in the side panels 26 when the extendable portions 21 are retracted to be the front panel of the cargo bed 2. The extendable portions 21 also have upwardly-opened openings 25 of the same shape and size as the openings 24 of the side panels 26, at opposing ends.

Accordingly, when user wants to extend the cargo space, the user pulls out the screen shield 5 from the openings 24 of the side panels 26. Then, the user rotates each of the extendable portions 21 from the solid-lined retracted position to the two-dot-chain-lined extended position, each rotating approximately 90 degrees. The user then reattaches the screen shield 5 to the openings 25 of the extendable portions 21. Here, the narrowed lower section of the screen shield 5 is configured to reach down to the upper surface of the bottom plate 20 so that it also serves as the front panel of the cargo bed 2 when the extendable portions 21 are extended.

The extension of the cargo bed 2 may also be achieved as shown in FIG. 7. In this example, the extendable portions 21 are provided so as to slide relative to the cargo bed 2 in a longitudinal direction of the vehicle. The extendable portions 21 may be provided to the bottom plate 20 or the side panels 26 through an appropriate sliding mechanism such as a combination of rollers and rails. In this example, the extendable portions 21 typically do not serve as the front panel of the cargo bed 2 since they are forwardly extendable to an extended configuration (as shown with two-dot-chain lines in FIG. 7) from a retracted configuration (as shown with solid lines in FIG. 7). Instead, in this example, the narrowed lower section of the screen shield 5 serves as the front panel of the cargo bed 2 when the extendable portions 21 are extended as described above. To achieve this, the extendable portions 21 have upwardly-opened openings 25 at foremost ends to accommodate the bosses 50 of the screen shield 5. In this example, the screen shield 5 may be fixed to the extendable portions 21 and moved with the extendable portions 21, since a distance between the openings 25 does not change during the slide movement of the extendable portions 21.

In the above embodiments, it has been described that backrest portion of the bench-type rear seat is foldable to provide the space for the cargo bed, however, it will be appreciated by those skilled in the art that only a section thereof may be foldable and moveable between the deployed and retracted positions, or the rear seat may have a plurality of independently stowable and deployable sections. In addition, while a two-seat type vehicle has been illustrated, it will be appreciated that the present invention is also applicable to utility vehicles with only one seat, in which the seat's backrest portion on a passenger's side is independently foldable relative to the driver's side. Further, while bench seats have been illustrated, it will be appreciated that the present invention is applicable to utility vehicles of a non-bench-seat type in which the passenger's seat is foldable and the entire passenger's seat is independently formed from the driver's seat. Further, as described above, it will also be appreciated by those skilled in the art that the present invention is also applicable to utility vehicles with three or more rows of seats.

Figure 8A:
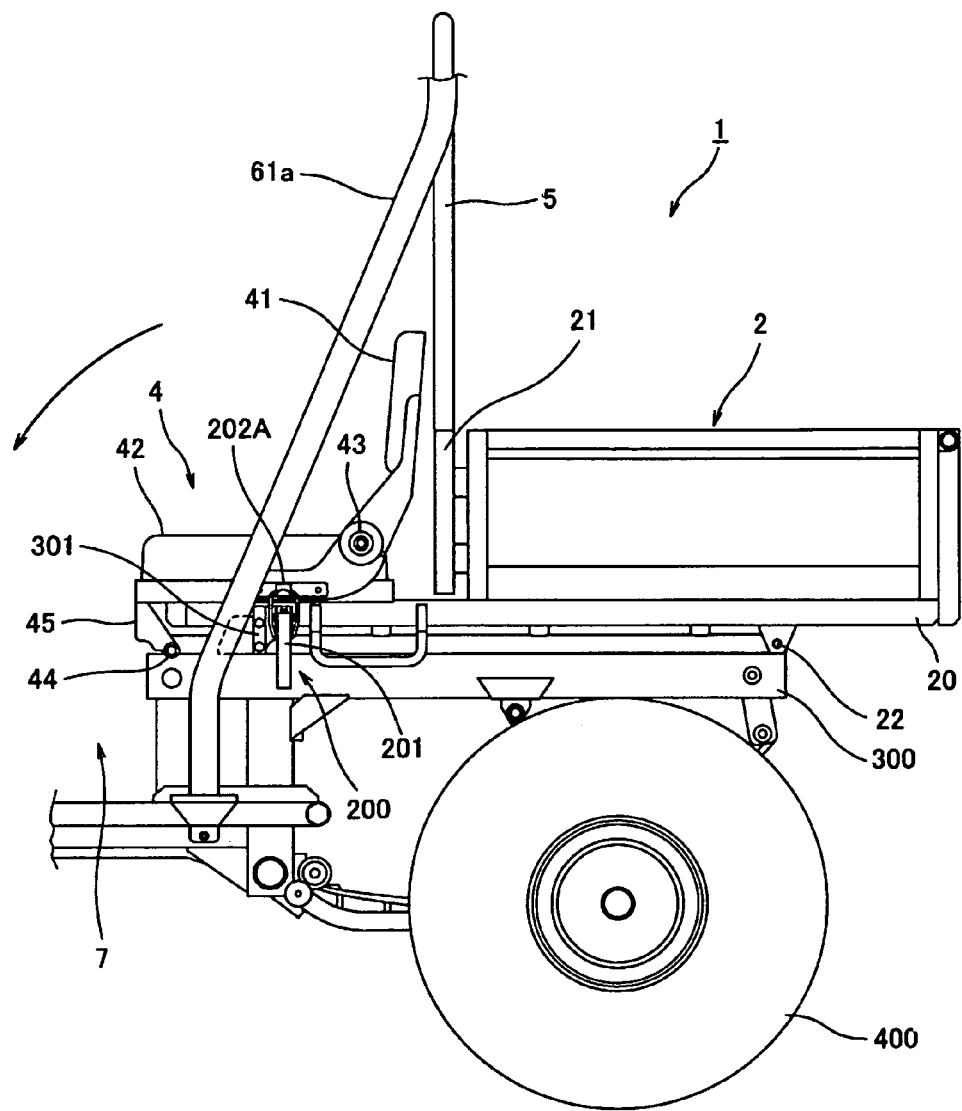
FIG. 8A is a partial side view of a utility vehicle according to another embodiment of the present invention, the utility vehicle being similar to the embodiment shown in FIG. 6, and further being equipped with a two-way latch system, the utility vehicle being shown with the rear seat in the deployed configuration.
Figure 8B:
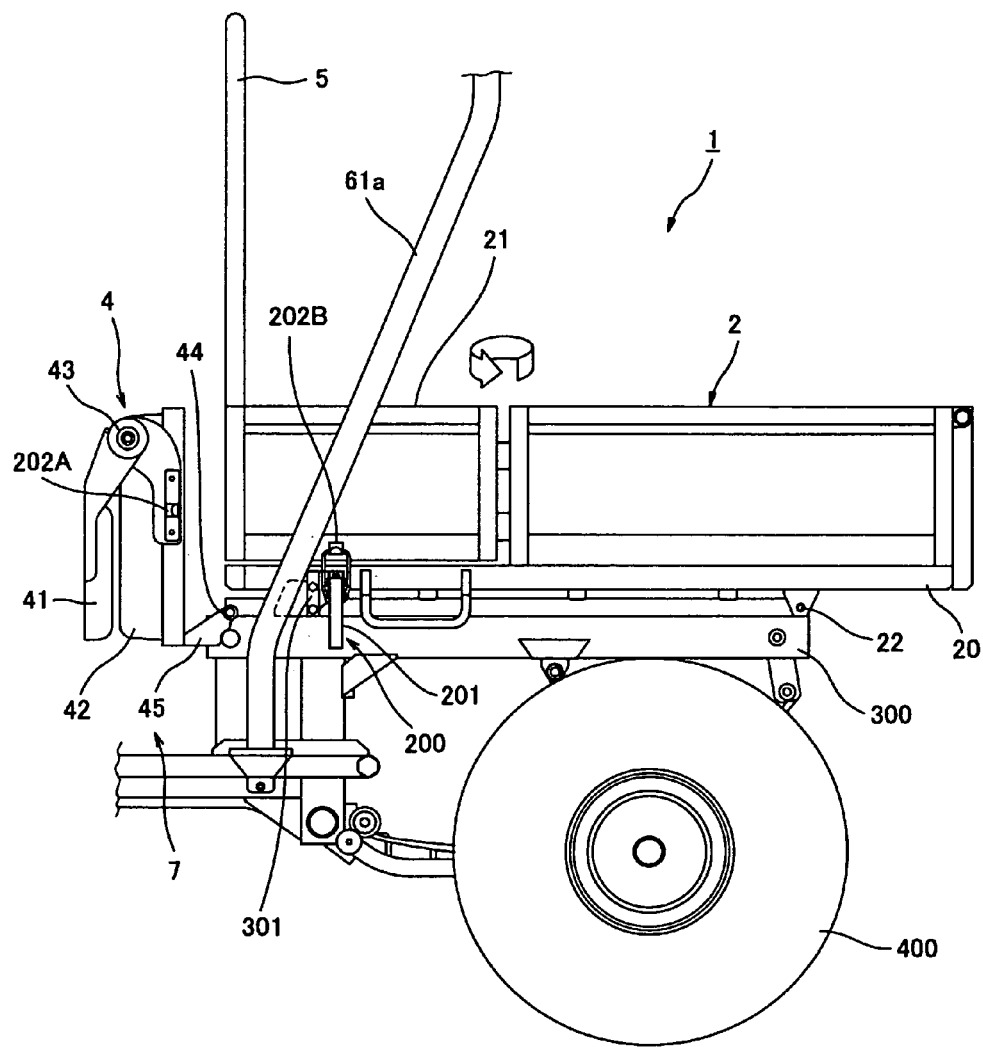
FIG. 8B is a partial side view of the utility vehicle with two-way latch system of FIG. 8A, showing the rear seat in the stowed configuration.

According to another embodiment of the present invention, shown in FIGS. 8A and 8B, a pair of latch systems 200 may be positioned on the vehicle 1 with the cargo bed 2 shown in FIG. 6 in which extendable portions or front panels 21 of the cargo bed 2 are configured to rotatably transition between a first configuration, also referred to as an extended configuration and a second configuration, also referred to as a retracted configuration. FIG. 8A illustrates the retracted configuration of the cargo bed 2 and, at the same time, the deployed configuration of the rear seat 4. FIG. 8B illustrates the extended configuration of the cargo bed 2 and, at the same time, the stowed configuration of the seat 4. It will be appreciated that utility vehicle 1 of FIGS. 8A and 8B is similar to the utility vehicle shown in FIG. 6, except with regard to the latch system 200. Similar components are numbered with like reference numerals, and will not be redescribed for the sake of brevity.

As shown in FIG. 8A, vehicle 1 is provided with a pair of latch systems 200 that are provided on both sides of the vehicle, each of which is configured to alternatively secure the movable seat 4 or the adjustable cargo bed 2 relative to the vehicle body. In FIGS. 8A and 8B, only the left-side of the vehicle 1 is illustrated, however, the right and left sides are mirror images of each other. Therefore, only the left-side configuration will be explained hereinafter to avoid redundancy.

Latch system 200 typically includes a latch body 201, a first latch retainer 202A, and a second latch retainer 202B. The latch body 201 is typically attached to a portion of the vehicle body at a fixed location adjacent a location of the extendable portion 21 in the extended configuration. The vehicle body includes several suitable fixed locations at which the latch body 201 may be mounted. For example, the vehicle body includes the rear portion of the side bar 61, also referred to as a beam 61a, that extends upwardly adjacent a side of the rear seat 4, as well as a frame member 300 that extends rearwardly under both the rear seat 4 and cargo bed 2. In the depicted embodiment, the latch body 201 is attached to beam 61a by a mount 301 that is typically welded to the beam. Alternatively, it will be appreciated that the latch body may be attached to another portion of the vehicle body, such as to a portion of frame member 300 that is adjacent the extendable portion 21 in the extended configuration.

Figure 9:
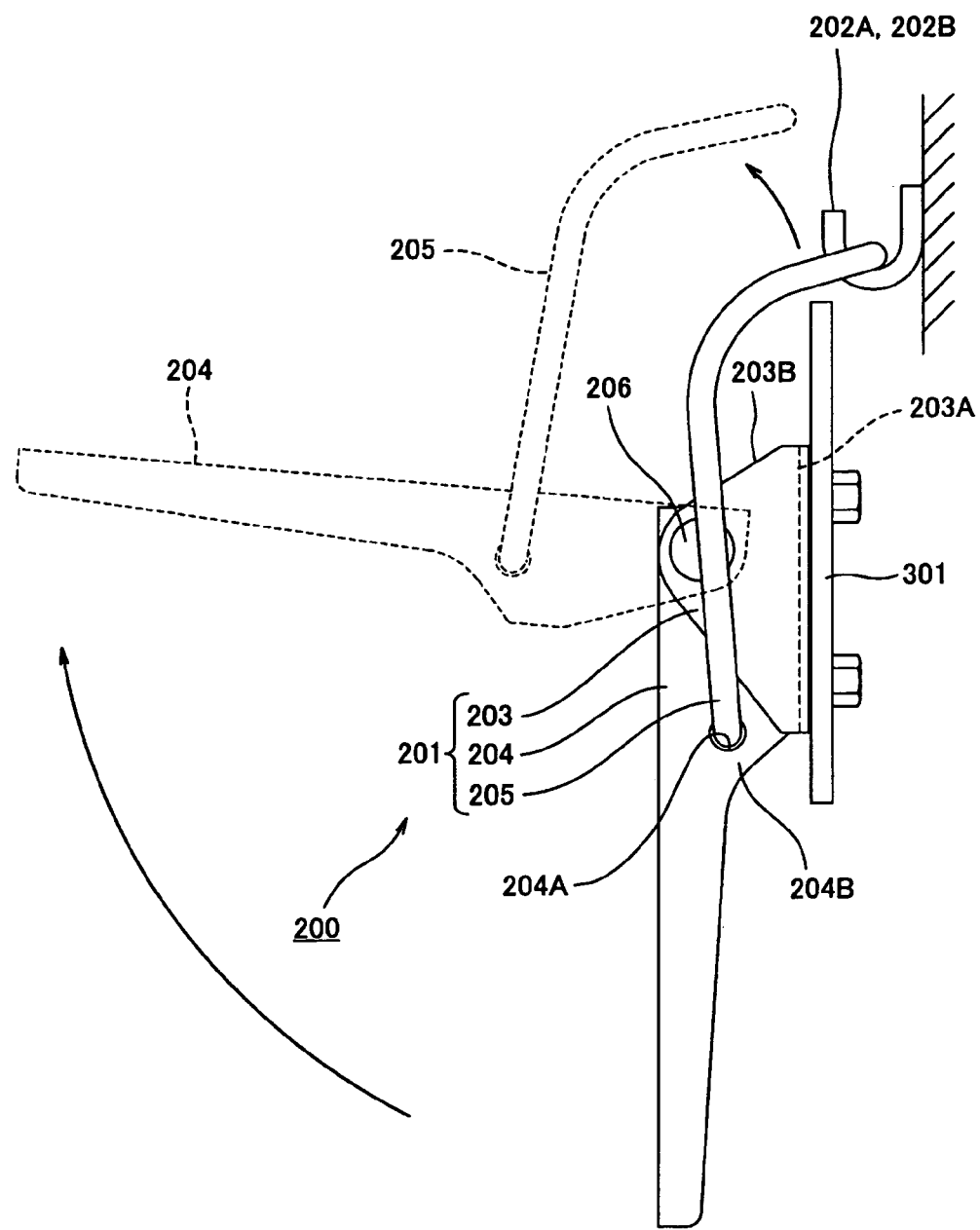
FIG. 9 is a rear view of the two-way latch system shown in FIGS. 8A and 8B.

As shown in FIG. 8A, the first latch retainer 202A is typically provided on an outer edge of the bottom portion 42 of movable seat 4. Alternatively, the latch retainer 202A may be positioned at another suitable location on the moveable seat 4. As shown in FIG. 8B, the second latch retainer 202B is typically provided on an outer side of the extendable portion 21 of the cargo bed 2. It will be noted that the position of the first latch retainer 202A when the movable seat is in the deployed configuration and the position of the second latch retainer 202B when the extendable portion 21 is in the extended configuration is substantially the same, and is adjacent the latch body 201. As shown in FIG. 9, a mounting surface of the mount 301 for the latch body 201 is outwardly offset relative to the mounting surfaces for the latch retainers 202A, 202B.

As shown in FIG. 9 from a rear view, the latch system 200 is typically configured as an over-center latch. However, this configuration is provided merely for illustrative purposes, and it should be recognized that other suitable types of latch configurations may be used. The latch body 201 of the latch system 200 typically includes a base 203, a lever 204, and a latch loop 205. The base 203 typically is formed substantially in a channel shape extending vertically, and is attached to the vehicle body via the mount 301 at a web portion 203A of the base. A pair of flange portions 203B of the base 203 extend laterally away from the vehicle body.

The lever 204 typically is formed substantially in a channel shape extending vertically and configured to be narrower than the channel formed in the base 203. The top portion of the lever 204 is accommodated between the flange portions 203B of the base 203, and both flange portions 204B of the lever 204 are pivotally attached, at the top end thereof, to the respective flange portions 203B of the base 203 through a shaft 206 laterally extended between the flange portions 203B. The latch loop 205 is formed of in an inverted U-shape, and both lower end portions of the loop 205 are bent in opposed direction, although the lower end portions are not illustrated in FIG. 9. The latch loop 205 typically is formed of a resilient material such as metal, and exhibits a spring force when pulled down by the latch, as described below. The lower end portions of the latch loop 205 are fitted into respective holes 204A formed in each of the flange portions 204B of the lever 204 at the middle thereof such that the loop 205 can be rotated around the holes 204A.

In FIG. 9, an interlocking configuration of the lever 204 shown in solid lines. In the interlocking configuration, an upper end portion of the loop 205 of the lever 204 interlocks with one of latch retainers 202A, 202B. The upper end portion of the loop 205 is configured to be bent toward the mounting surfaces of the latch retainers 202A, 202B.

To release the latch from the interlocking configuration, a user simply lifts to rotate the lever 204 in a direction indicated by an arrow in FIG. 9, and unhooks the latch loop 205 from the latch retainer. The latch thus assumes a released configuration indicated by dashed lines in FIG. 9. To transition from this released configuration to a latched configuration again, the user typically maintains the lever 204 up, hooks the latch loop 205 to one of the latch retainers, and draws the lever down against a spring force of the latch loop 205 until the base end of the latch loop 205 exceeds the rotational center of the lever 204 into the interlocking configuration.

Returning to FIG. 8A, the latch body 201 interlocks with the first latch retainer 202A provided on the movable seat 4 in the deployed configuration while the adjustable cargo bed 2 is in the retracted configuration. A user manipulates the lever 204 of the latch body 201 to unhook it from the first latch retainer 202A, to release the seat 4. The user then folds the backrest portion 41 of the seat 4 onto the bottom portion 42 of the seat 4 and, further, retracts the whole of the folded seat 4 forward into leg space 7 to place the seat 4 in the stowed configuration, as shown with an arrow in FIG. 8A. Next, the user removes the divider or screen shield 5, and then rotates to extend the extendable portions 21 of the cargo bed 2 forward into the space freed by moving the seat 4, to place the cargo bed 2 in the extended configuration. The direction of rotation is shown with a wide arrow in FIG. 8B. Then, the user attaches the screen shield 5 to the foremost ends of the extendable portions 21 of the cargo bed 2. Finally, the user uses the same latch body 201 to interlock with the second latch retainer 202B provided on the extendable portions 21 of the cargo bed 2, to achieve the configuration shown in FIG. 8B. To again deploy the seat, the user can go through a reversed process to return to the configuration shown in FIG. 8A.

As explained above, a single latch body 201 may be used for the latch system 200. To achieve this configuration, the first latch retainer 202A is located in an interlockable position relative to the latch body 201 when the seat 4 is in the deployed configuration and the cargo bed 2 is in the retracted configuration and, further, the second latch retainer 202B is located in an interlockable position relative to the latch body 201 when the seat 4 is in the stowed configuration and the cargo bed 2 is in the extended configuration. Typically, the respective interlockable positions of the first and second latch retainers are located in substantially the same location. Alternatively, the respective latch retainers may have different interlockable positions, from each of which the latch loop 205 may interlock with the respective latch retainer.

It will further be appreciated that the seat 4 in the deployed configuration is configured to securely hold the bottom plate 20 of the cargo bed 2, by pressing against the bottom plate 20 from above, when the latch system 200 is secured. This inhibits unintentional tilting of the cargo bed around pivot 22.

Figure 10A:
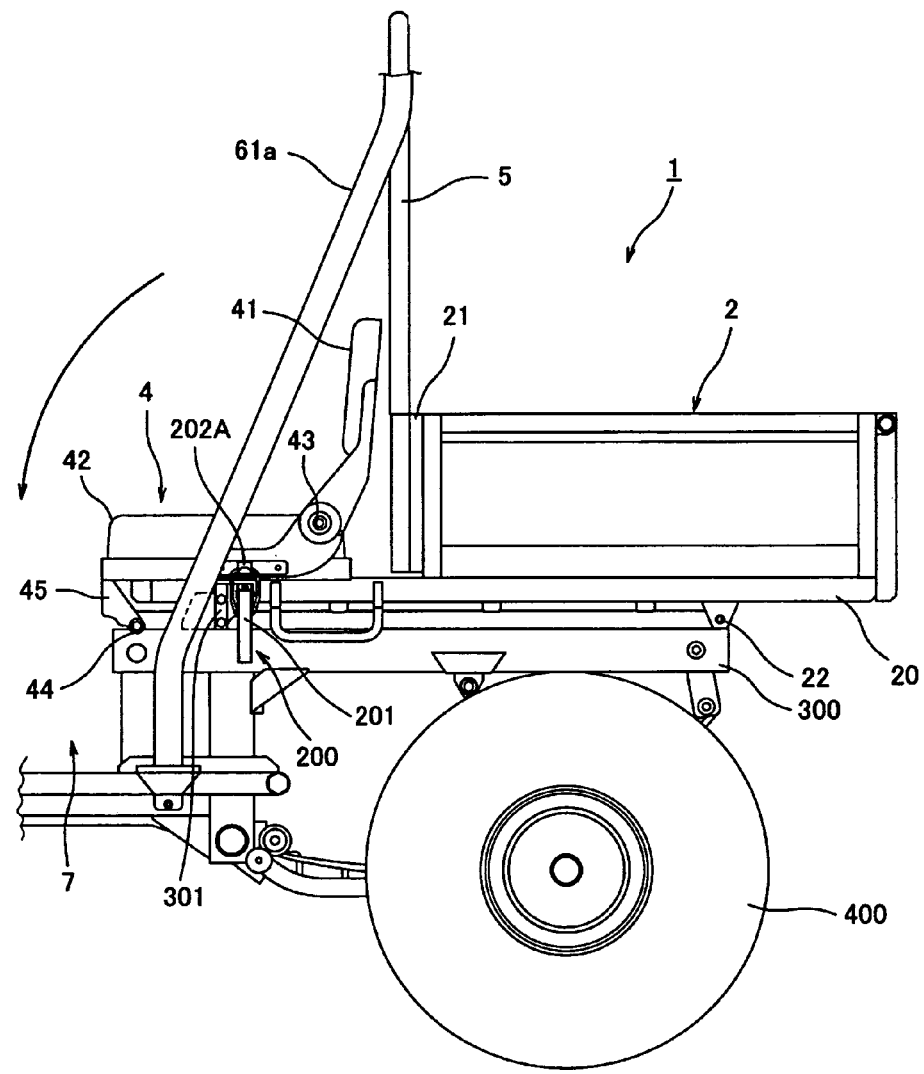
FIG. 10A is a partial side view of a utility vehicle according to another embodiment of the present invention, the utility vehicle being similar to the embodiment shown in FIG. 7, and further being equipped with a two-way latch system, the utility vehicle being shown with the rear seat in the deployed configuration.
Figure 10B:
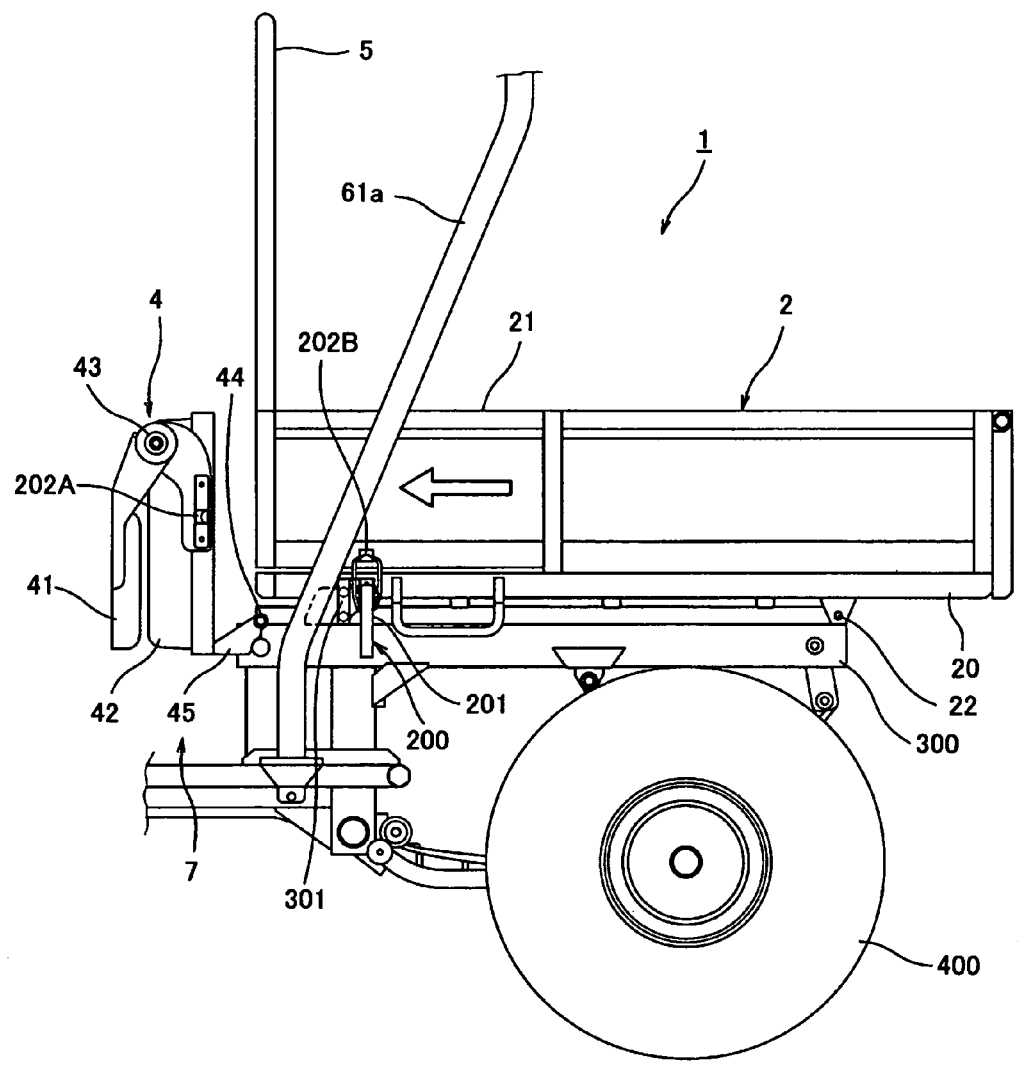
FIG. 10B is a partial side view of the utility vehicle with two-way latch system of FIG. 10A, showing the rear seat in the stowed configuration.

According to still another embodiment of the present invention, shown in FIGS. 10A and 10B, latch system 200 may be applied to the vehicle 1 with the cargo bed 2 of the configuration shown in FIG. 7, in which the extendable portions of the cargo bed are configured to slide from a second configuration, also referred to as a retracted configuration to a first configuration, also referred to as an extended configuration, along the sides of the cargo bed. FIG. 10A illustrates the retracted configuration of the cargo bed 2 and, at the same time, the deployed configuration of the seat 4. FIG. 10B illustrates the extended configuration of the cargo bed 2 and, at the same time, the stowed configuration of the seat 4. In this embodiment, similar components to that of the embodiment shown in FIG. 7 are designated with the like reference numerals. Only the left-side configuration will be explained to avoid redundancy, in the same manner as the aforementioned embodiment.

As shown in FIG. 10A, in this embodiment, the first latch retainer 202A of the latch system 200 is typically provided on an outer side of the bottom portion 42 of the movable seat 4, as in the aforementioned embodiment. As shown in FIG. 10B, the second latch retainer 202B is typically provided on an outer side of the extendable portion 21 of the cargo bed 2 which is configured to be slidable from the retracted configuration shown in FIG. 10A to the extended configuration shown in FIG. 10B. As one may notice from FIG. 10B, the second latch retainer 202B typically is configured not to interfere with the non-extendable portion of the cargo bed 2. For example, a recess or groove (not shown) may be formed on an inside surface of the non-extendable portion to accommodate passage of the latch retainer 202B as the extendable portion 21 slides backwards and forwards relative to the non-extendable portion.

Returning to FIG. 10A, the latch body 201 interlocks with the first latch retainer 202A provided on the movable seat 4 in the deployed configuration while the adjustable cargo bed 2 is in the retracted configuration. A user manipulates the lever 204 of the latch body 201 to unhook it from the first latch retainer 202A to release the seat 4. The user then folds the backrest portion 41 of the seat 4 onto the bottom portion of the seat 4 and, further, retracts the whole of the folded seat 4 into leg space 7 to place the seat 4 in the stowed configuration, as shown with an arrow in FIG. 10A. Next, the user removes the divider or screen shield 5, and slides to extend the extendable portions 21 of the cargo bed 2 forward into the space freed by moving the seat 4, to place the cargo bed 2 in the extended configuration, as shown with a wide arrow in FIG. 10B. Then, the user attaches the screen shield 5 to the foremost ends of the extendable portions 21 of the cargo bed 2. Finally, the user uses the same latch body 201 to interlock with the second latch retainer 202B provided on the extendable portions 21 of the cargo bed 2, and the configuration shown in FIG. 10B is achieved. It will be appreciated that the user can proceed through the process in reverse to return the cargo bed 2 to the configuration shown in FIG. 10A.

Figure 11A:
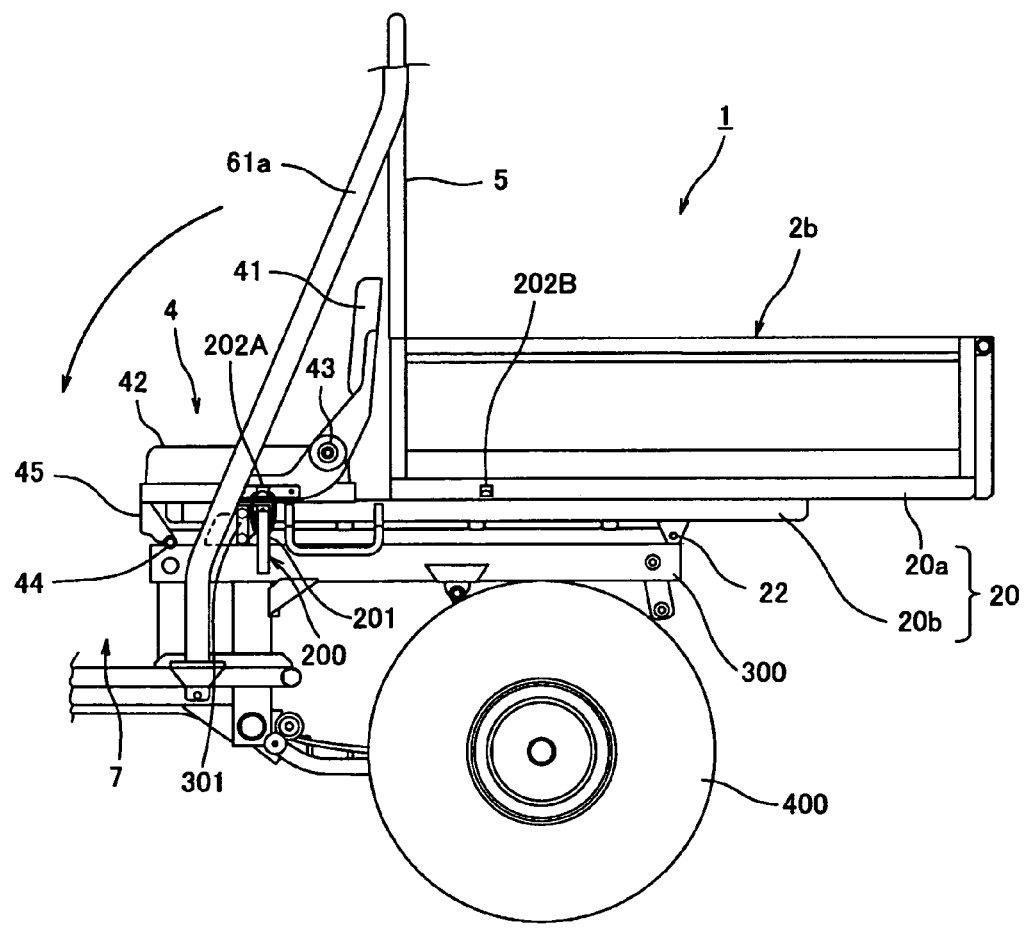
FIG. 11A is a partial side view of a utility vehicle according to another embodiment of the present invention, the utility vehicle being similar to the embodiment shown in FIG. 3A, and further being equipped with a two-way latch system, the utility vehicle being shown with the rear seat in the deployed configuration.
Figure 11B:
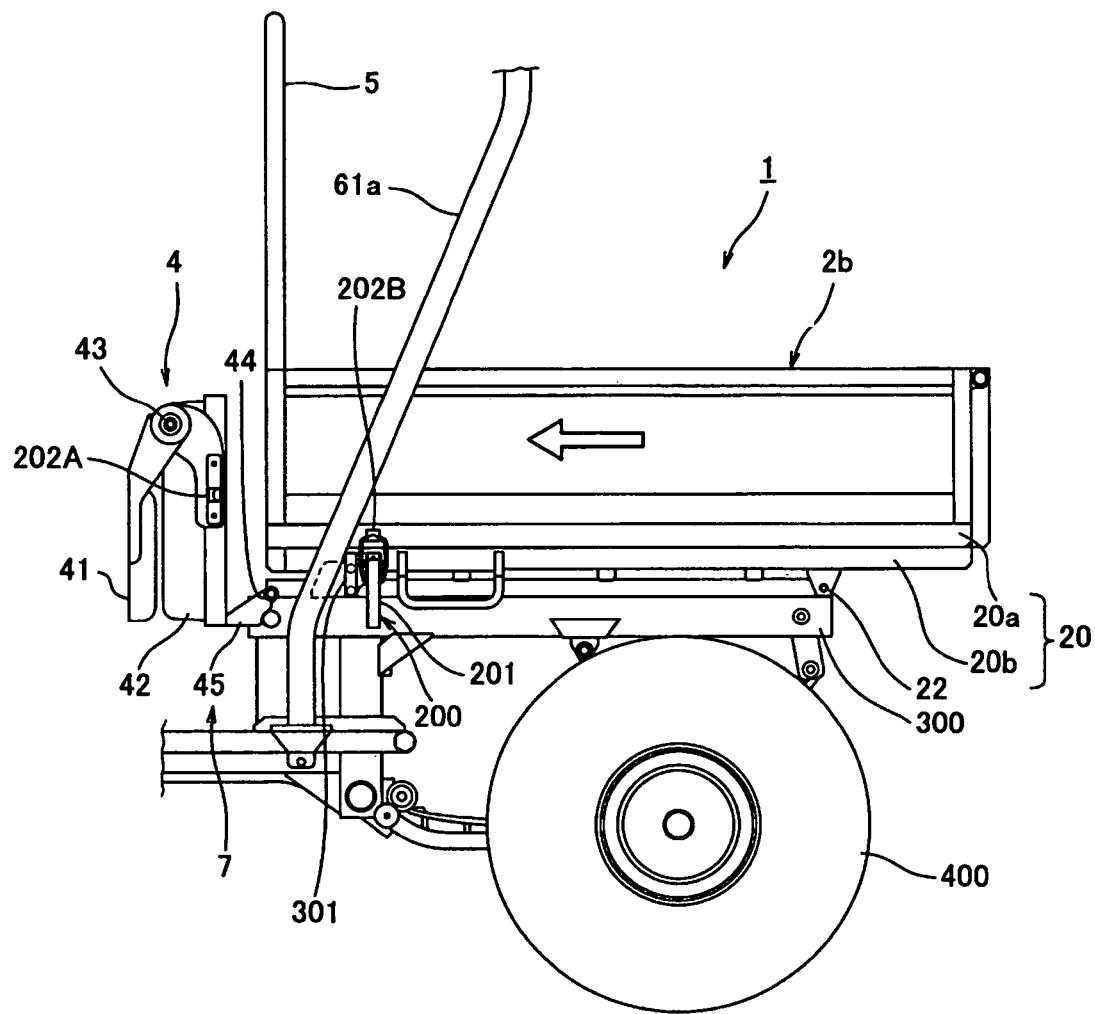
FIG. 11B is a partial side view of the utility vehicle with two-way latch system of FIG. 11A, showing the rear seat in the stowed configuration.

According to still another embodiment of the present invention, shown in FIGS. 11A and 11B, latch system 200 similar to the above embodiments is applied to a vehicle 1 with a cargo bed 2 having the configuration shown in FIGS. 3A and 3B in which the entire cargo bed 2 is configured to slide from a second configuration, also referred to as an overhang configuration to a first configuration, also referred to as an compact configuration. FIG. 11A illustrates the overhang configuration of the cargo bed 2 and, at the same time, the deployed configuration of the seat 4. FIG. 11B illustrates the compact configuration of the cargo bed 2 and, at the same time, the stowed configuration of the seat 4. In this embodiment, similar components to that of the embodiment shown in FIGS. 3A and 3B are designated with like reference numerals. Only the left-side configuration will be explained hereinafter to avoid redundancy, in the same manner as the aforementioned embodiment.

As shown in FIG. 11A, in this embodiment, the first latch retainer 202A of the latch system 200 is typically provided on an outer side of the bottom portion 42 of the movable seat 4. As shown in FIG. 11B, the second latch retainer 202B is typically provided on an outer side of the cargo bed 2.

Returning to FIG. 11A, the latch body 201 interlocks with the first latch retainer 202A provided on the movable seat 4 in the deployed configuration while the adjustable cargo bed 2 is in the overhang configuration. A user manipulates the lever 204 of the latch body 201 to unhook it from the first latch retainer 202A to release the seat 4. The user then folds the backrest portion 41 of the seat 4 onto the bottom portion of the seat 4, and, further, retracts the whole of the folded seat 4 into leg space 7 to place the seat 4 in the stowed configuration, as shown with an arrow in FIG. 11A. Next, the user removes the divider or screen shield 5, and slides the entire cargo bed 2 forward as a unit into the space freed by moving the seat 4, to place the cargo bed 2 in the compact configuration, as shown with a wide arrow in FIG. 11B. Then, the user attaches the screen shield 5 back to the foremost ends of the cargo bed 2. Finally, the user uses the same latch body 201 to interlock with the second latch retainer 202B provided on the cargo bed 2, and the configuration shown in FIG. 11B is achieved. It will be appreciated that the user can proceed through a reversed process to place the cargo bed back in the configuration shown in FIG. 11A.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A pick-up style utility vehicle including a vehicle body, the vehicle comprising:
   a seat coupled to the vehicle body and configured to be movable between a stowed configuration and a deployed configuration;
   a cargo bed adjustably provided behind the seat and configured to be adjustable to a first configuration in which the cargo bed is moved into an area formerly occupied by the seat after the seat is retracted in the stowed configuration, and to a second configuration in which the cargo bed is moved away from the area to be occupied by the seat in the deployed configuration; and
   a latch including a latch body and a first latch retainer and a second latch retainer;
   wherein the latch body is provided on the vehicle body and configured to alternatively be secured to the seat or to the cargo bed by interlocking with either the first latch retainer or the second latch retainer;
   wherein the first latch retainer is provided on the seat, and configured to be located in an interlockable position relative to the latch body when the seat is in the deployed configuration and the cargo bed is in the second configuration; and
   wherein the second latch retainer is provided on the cargo bed, and configured to be located in the interlockable position relative to the latch body when the seat is in the stowed configuration and the cargo bed is in the first configuration.

2. The pick-up style utility vehicle of claim 1, wherein the seat is at least a rearmost one of a plurality of seats disposed in a tandem manner.

3. The pick-up style utility vehicle of claim 1, wherein a portion of the cargo bed is configured to slide from the first to the second configuration.

4. The pick-up style utility vehicle of claim 3, wherein the portion of the cargo bed forms a side portion of the cargo bed.

5. The pick-up style utility vehicle of claim 1, wherein a portion of the cargo bed is configured to rotate from the first to the second configuration.

6. The pick-up style utility vehicle of claim 1, wherein the latch is an over-center latch.

7. The pick-up style utility vehicle of claim 1, wherein the latch body includes:
   a base attached on the body of the vehicle;
   a lever pivotably accommodated in the base, and is configured to be manipulable by a user; and
   a latch loop extended from the lever, and configured to be hooked to the latch retainer.

8. A method for configuring a vehicle having a vehicle body, a seat, a cargo bed and a latch configured to alternatively secure the seat or the cargo bed, wherein the latch includes a latch body and a first latch retainer and a second latch retainer, the method comprising:
   releasing the latch body from the first latch retainer provided on the seat;
   moving the seat from a deployed configuration to a stowed configuration, thereby freeing space formerly occupied by the seat in the deployed configuration;
   moving the cargo bed from a first configuration to a second configuration, into the space freed by moving the seat; and
   securing the second latch retainer provided on the cargo bed to the latch body.

9. A latch system for a pick-up style utility vehicle having a vehicle body, a movable seat and an adjustable cargo bed, wherein the movable seat coupled to the vehicle body and configured to be movable between a stowed configuration and a deployed configuration, and the adjustable cargo bed adjustably provided behind the seat and configured to be adjustable to a first configuration in which the cargo bed is moved into an area formerly occupied by the seat after the seat is retracted in the stowed configuration, and to a second configuration in which the cargo bed is moved away from the area to be occupied by the seat in the deployed configuration, and the latch system comprising:
   a latch body provided on the vehicle body;
   a first latch retainer provided on the movable seat; and
   a second latch retainer provided on the adjustable cargo bed;
   wherein the latch body is configured to alternatively secure the movable seat or the adjustable cargo bed by interlocking with either the first latch retainer or the second latch retainer;
   wherein the first latch retainer is configured to be located in an interlockable position relative to the latch body when the movable seat is in the deployed configuration and the adjustable cargo bed is in the second configuration; and
   wherein the second latch retainer is configured to be located in the interlockable position relative to the latch body when the movable seat is in the stowed configuration and the adjustable cargo bed is in the first configuration.

* * * * *